Nov. 21, 1933.          J. A. RATTA          1,935,747
SOLDERING FORM FOR CABLES
Filed Dec. 16, 1932

INVENTOR
J. A. Ratta
BY
ATTORNEY

Patented Nov. 21, 1933

1,935,747

UNITED STATES PATENT OFFICE 1,935,747

SOLDERING FORM FOR CABLES

James A. Ratta, Brooklyn, N. Y., assignor to American Telephone and Telegraph Company, a corporation of New York Application December 16, 1932
Serial No. 647,691

5 Claims. (Cl. 22—116)

This invention relates to soldering forms particularly adapted for use with electric cables.

In practice, bonding ribbons, pressure testing appliances such as testing flanges, valve stems, sealing fittings, nipples and other devices are applied to cables and solder is afterwards applied to secure joints having the necessary electrical and mechanical properties. The cables if not protected during the application of solder to such devices are subjected to burns during the soldering operations which cause damage to the sheaths eventually resulting in openings therein. Moisture enters through these openings and causes damage to the conductors contained in the cables.

It is an object of this invention to prevent damage to the cables by providing an improved device to protect the sheaths of said cables from burns during operations of the above character.

Another object is to provide a soldering form which requires a minimum amount of time in its application to a cable sheath, and which is also economical in cost.

These and further objects will be apparent from the following description when considered in connection with the accompanying drawing in which one embodiment of the invention is illustrated.

Referring to the drawing, Figure 1 is a plan view of one type of the improved soldering form.

Figure 3:
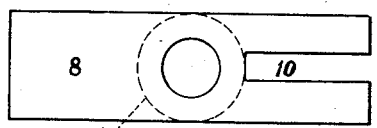
Fig. 3 is a view similar to Fig. 1, showing a slot provided on one end of the form.
Figure 8:
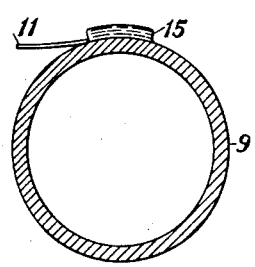
Fig. 8 is a sectional view of a cable showing a bonding ribbon soldered thereto after the removal of the improved form.

In the drawing illustrating this invention the reference 5 is applied to the improved form which includes a central pad portion 6 which may be of substantial thickness and composed of flexible material such as cotton, felt, asbestos, or synthetic or processed compositions which tend to resist heat. The pad 6 for the purpose of illustration, is shown as having a central opening 7 of circular formation. This opening is provided for the reception of molten solder and serves as a form or mold therefor. A layer of material 8 which is heat resisting is applied to the top surface of pad 6, and a central opening is provided therein which coincides with the opening 7 in the pad. This material may be treated or surfaced with a suitable heat resistant coating or a layer of different material having suitable characteristics may be applied. Paper of sufficient thickness and stiffness has been found to be a suitable material to use. In the form shown in Figs. 1 to 3, the layer 8 is gummed throughout its lower surface, and the length of this layer is such as to embrace a substantial area of the circumference of a cable sheath 9 when applied thereto in order to provide suitable adhesion space to maintain the form in position. In these figures, the pad 6 is securely attached to the approximate center of the layer 8. In Fig. 3, a slot 10 is provided at one end of the layer to accommodate a bonding ribbon 11 as shown in Fig. 8.

Figure 4:
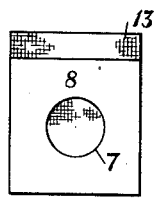
Fig. 4 is a plan view of a modification of the improved form.
Figure 5:
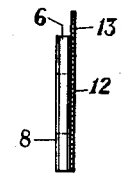
Fig. 5 is an end or edge view of Fig. 4.

In the modification illustrated in Figs. 4 and 5, the heat resisting layer 8 is of a size corresponding to the pad 6. The layer 8 has one of its surfaces treated so that when applied to the pad 6 it adheres thereto. A sheet of material 12 is applied to the adhesively treated surface of the pad 6 and serves as a protective covering therefor. The sheet 12 may be of some such material as gauze, starched muslin, or the like. This material 12 is of slightly larger area than the layer 8 and associated layers, to provide a portion 13 which extends beyond these elements. The extended portion 13 serves as a tab which may be grasped to separate the sheet 12 from the pad 6 and thus expose the adhesive surface thereof. In practice, this exposed surface is applied to a cable sheath to which it adheres, and maintains the improved form in position thereon, as will be presently described.

Figure 6:
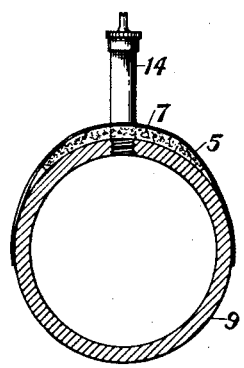
Fig. 6 is a sectional view of a cable showing the form illustrated in Figs. 1 and 2 in place thereon, and about a valve stem in readiness for the soldering operation.
Figure 7:
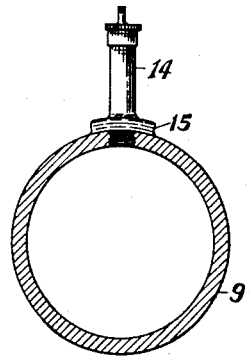
Fig. 7 is a view similar to Fig. 2 with the improved form removed after the completion of such operation.

In Fig. 6 of the drawing, the improved form as shown is applied to a cable sheath 9 about the valve stem 14. This stem it will be assumed, is threaded into the cable sheath, and the improved form is applied by means of the adhesive surface of the layer 8 to the cable sheath. The flexibility of the form under this condition, will permit it to adapt itself to the curvature of the sheath. The stem 14 will be centrally positioned with respect to the opening 7 in the form, so that a uniform chamber or space for solder is provided between the outer surface of the stem and the edge of the opening. After the molten solder has been applied and solidified, the form may be removed leaving a uniform collection of solder about the stem as shown at 15 in Fig. 7.

The form 5 may be applied to the cable sheath and bonding ribbon 11 illustrated in Fig. 8 in a manner somewhat similar to that described in connection with Fig. 6. In this case, however, the form illustrated in Fig. 3 is applied and the end of the ribbon extends through the slot 10 therein. The ends of the adhesive surface of the layer 8 are applied to the cable sheath as in Fig. 6, and maintain the form in position during the soldering operation. A uniform collection of solder 15 secures the bonding ribbon 11 in position on the sheath as shown.

Figure 9:
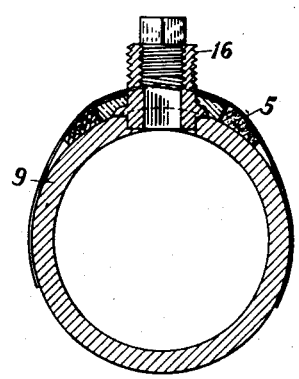
Fig. 9 is a sectional view showing the completed operation of a testing flange soldered to a cable before the removal of the improved form.

The testing flange 16 illustrated in Fig. 9, is applied to the cable sheath 9 similarly to that outlined in connection with the valve stem of Fig. 8, and upon the removal of the form 5 the testing flange will be securely positioned on the cable sheath.

Figure 1:
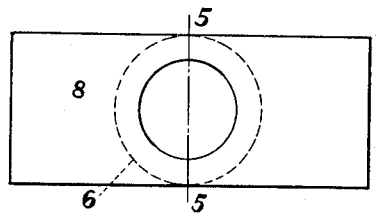
Figure 2:
Fig. 2 is an end or edge view of Fig. 1.

The form shown in Figs. 4 and 5 may be applied to the sheath 9 to maintain the various elements shown in Figs. 6, 7, 8 and 9 in position, by operations similar to those described in connection with the attachment of these elements by means of the forms illustrated in Figs. 1 to 3.

While the arrangements of this invention have been illustrated as applied to certain forms of attachments to cable sheaths, which have been deemed desirable, it will be understood that they are capable of embodiment in other forms of cable attachments, without departing from the spirit of the invention as defined in the appended claims.

What is claimed is:

1. A soldering form for cables including a strip of material having an adhesively coated surface, a flexible pad attached to the approximate center of said strip, said strip of material and said pad having coinciding openings therethrough for the introduction of molten solder.

2. A soldering form for cables including a strip of material having one of its surfaces treated to adhere to the cable, said material being of a heat resisting character, a pad of substantial thickness attached to the adhesively treated surface of the strip of material at its approximate midpoint, said material and pad having an opening therethrough adapted to surround a fitting extending from the cable to permit molten solder to be uniformly applied about the fitting to secure the fitting in position on the cable.

3. A soldering form for cables comprising a pad of substantial thickness and including a plurality of layers of flexible material adapted to conform to the curvature of a cable sheath, said layers having an opening adapted to surround a tube fitted to a cable to permit soldering material to be uniformly applied around the tube.

4. A soldering form for cables including an under layer of adhesive material, a protective covering of gauze therefor which may be readily removed, a pad of felt-like material of substantial thickness lying about said adhesive material, and a top layer of material adapted to partially resist heat applied to said layer of felt-like material, the whole pad having a perforation therethrough so that when the gauze is removed and the pad applied to the surface of a cable sheath by said adhesive material molten solder may be poured into the chamber formed by the perforation.

5. A soldering form for applying a spot of solder to the exterior surface of a cable sheath for the purpose of soldering to the sheath a fitting, said form including a strip of adhesively treated paper carrying a pad of flexible material, said paper and pad having a perforation therethrough with a diameter larger than said fitting, said strip of paper being pasted to the sheath in such position that the walls of said perforation surround said fitting, leaving a space between said walls and said fitting into which molten solder may be poured, the paper and pad being adapted to be stripped from the cable sheath after the mass of solder has solidified about said fitting.

JAMES A. RATTA.